United States Patent [19]
Förster

[11] 4,083,251
[45] Apr. 11, 1978

[54] PRESSURE GAUGE

[76] Inventor: Steffen Förster, D-7844 Neuenburg, Germany

[21] Appl. No.: 684,376

[22] Filed: May 7, 1976

[30] Foreign Application Priority Data

Jun. 18, 1975 Germany ............................ 2527201
Jun. 18, 1975 Germany ............................ 7519384

[51] Int. Cl.² ............................................. G01L 7/04
[52] U.S. Cl. ........................................ 73/738; 73/741
[58] Field of Search ............................ 73/411–418, 73/431, 277

[56] References Cited

U.S. PATENT DOCUMENTS

| | | | |
|---|---|---|---|
| 1,458,965 | 6/1923 | Bassett | 73/277 |
| 1,887,804 | 11/1932 | Faber | 73/412 |
| 1,950,031 | 3/1934 | Joyce | 73/411 |
| 2,215,013 | 9/1940 | Mickelberg | 73/416 |
| 2,676,490 | 4/1954 | Willach | 73/411 |
| 3,209,599 | 10/1965 | Harland et al. | 73/431 |
| 3,307,406 | 3/1967 | Oliver et al. | 73/418 |

*Primary Examiner*—Donald O. Woodiel
*Attorney, Agent, or Firm*—C. Emmett Pugh

[57] ABSTRACT

A pressure gauge has a plate on one face of which is mounted a flange portion which extends outwardly substantially at right angles from the plate. The flange has arranged therein an opening for receiving a mounting having an upper face and being adapted to receive a bourdon-like tube, this tube having a portion which extends from said mounting in the form of a hook. Preferably the hook-shaped tube portion has a straight section which forms an angle of about 45° with said upper face, and a curved section which ranges with the straight section and which embraces a pointer mechanism.

2 Claims, 6 Drawing Figures

PRESSURE GAUGE

BACKGROUND OF THE INVENTION

1. Field of the Invention

The present invention relates to a pressure gauge comprising a plate having a pointer mechanism and a bourdon-tube mounting plus connection arranged on one side thereof and a bezel arranged on on the opposite side thereof.

2. Prior Art

In such a pressure gauge, the pointer mechanism and the bourdon-tube mounting complete with the tube and connection, are attached to said surface of the disc-shaped supporting plate as by riveting. This baffle plate is rigidly fixed between the cup-shaped glass and the likewise cup-shaped cover, the connection between the glass and housing cover being effected by means of an adhesive. The cup-shaped housing cover exhibits an opening for the connection element of the bourdon tube mounting. The baffle plate is here designed at the same time as a bezel.

Such pressure gauges are encumbered with a number of drawbacks. One disadvantage is that the glass is not exchangeable something which is required in pressure gauges used in welding work. Because of the presence of the fixing element on the bourdon tube mounting and because of the lateral extension of the tube, the mounting plus connection is of relatively long length so that the costs of the materials for this component are relatively high. A major drawback is that there is no sealed connection between the opening in the housing cover and the bourdon tube mounting; this is not possible in fact. The space defined by the baffle plate and the cup-shaped housing cover, must be sealed however.

In such pressure gauges, however, there is the requirement for the housing cover to be provided with a blow-out hole which is normally closed off by a cover. The purpose of this is to ensure that in the event of a fault in the bourdon tube, the pressure developing inside the pressure gauge forces out the cover located at the back of the gauge. In this way, the pressure developed inside the gauge is collapsed without doing further damage to the gauge. The baffle plate is intended in the event of this kind of situation, to prevent the front of the gauge from being damaged,

GENERAL DISCUSSION OF THE PRESENT INVENTION

An object of the present invention is so to provide such a pressure gauge in which the bourdon-tube mounting is relatively short and the space defined by the baffle plate and housing cover can be sealed off. Another object is so to design the bourdon tube and to arrange it on the connecting element, that the assembly can be fitted in position through a hole.

Accordingly, this invention consists in a pressure gauge comprising a plate, a bourdon-like tube and a mounting therefore, wherein said plate is provided with a flange portion which extends outwardly substantially at right angles from said plate and which is provided with an opening for receiving said mounting, and wherein said bourdon-like tube has a portion which extends from said mounting in the form of a hook.

Preferably, the hooked portion of the bourdon tube has a straight section which forms an angle of approximately 45° with an adjacent surface of said mounting, and a second, curved section which merges with said first section and which is intended to embrace a pointer mechanism.

It is possible in this way to introduce the bourdon tube through the fixing hole whereupon the mounting can be welded in position in said hole using for example ultrasonic energy. Subsequently, the pointer mechanism and the bezel plate are assembled, the housing cover rigidly attached to the baffle plate and the sight glass fixed to the front of the baffle plate. In the present instance, the baffle plate thus constitutes part of the pressure gauge housing.

The blow-out hole provided in the housing cover, and the cover closing off said hole, are so designed that housing cover and blow-out hole cover are a one-piece item, a deliberate weak point being provided between the housing cover and the blow-hole cover.

BRIEF DESCRIPTION OF THE DRAWINGS

Embodiments of the invention will now be described in more detail with reference to the accompanying drawings; in which.

DETAILED DESCRIPTION OF PREFERRED EMBODIMENTS

Figure 1:
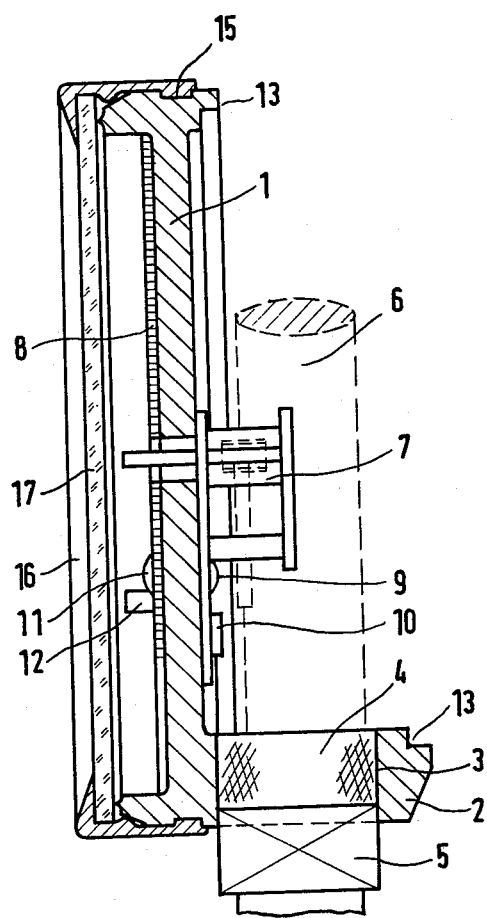
FIG. 1 is a diagrammatic sectional view of the pressure gauge in a partially assembled condition.

In FIG. 1, there is shown a plate 1, which is circular in shape and which is provided at the bottom thereof with a flange element 2 extending outwardly at right angles from the plane of the plate 1. This flange element 2 has provided therein a fixing hole 3, which is intended to accommodate a bourdon-tube mounting 4 with a connecting element 5 and a bourdon tube 6, the tube being shown in ghost lines in FIG. 1.

The plate 1 is preferably made from a synthetic resin material, and is provided with fixing elements for a pointer mechanism 7 and a bezel 8 associated therein.

The fixing elements for the pointer mechanism 7 comprise two studs 9 which are formed integrally with the plate 1, and a locking stud 10. Subsequent to assembling the pointer mechanism in position, the heads of the two studs 9 are deformed, so as to hold the pointer mechanism firmly in position. In a corresponding manner two fixing studs 11 for the bezel 8 are provided at the opposite side of the plate 1. On the side of the plate 1 remote from the mounting 4 there is a stop pin 12 for the pointer, this stop pin 12 being formed integrally with the baffle plate 1.

The baffle plate 1 and the flange element 2 are provided on the side thereof remote from the bezel 8 with a peripheral fixing rim 13 for a housing cover 14.

The plate 1 is also provided with a peripheral fixing groove 15 which is intended to receive a ring 16, said ring holding a sight glass 17 in position between the front of the plate 1 and the inward-pointing edge of the ring.

Figure 2:
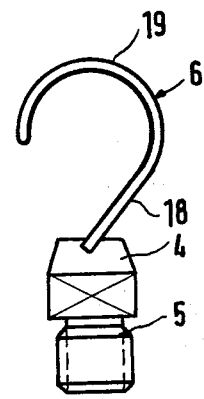
FIG. 2 shows diagrammatically and in side elevation the bourdon tube mounting with tube.
Figure 3:
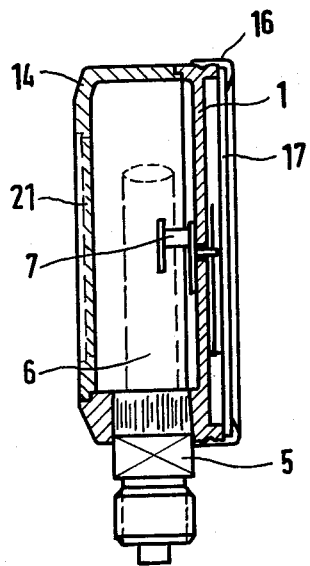
FIG. 3 is a diagrammatic sectional view of a fully assembled pressure gauge.
Figure 4:
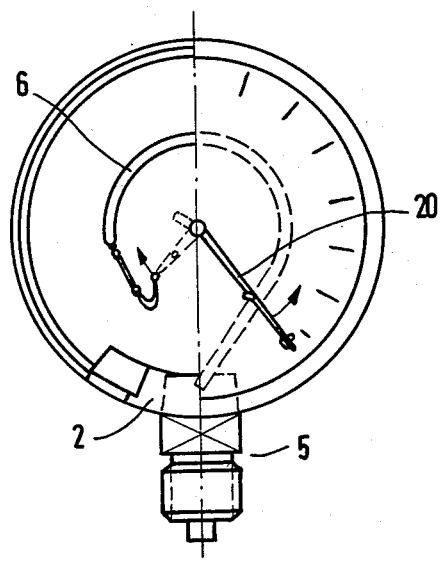
FIG. 4 is a diagrammatic view of the pressure gauge and of its interior.

In order to enable the bourdon tube 6 to be introduced, the tube is given a hook-shaped design and is attached to the top of the mounting 4 in the manner shown in FIG. 2. The bourdon tube mounting 4 is very short and has a length which is equivalent to approximately the thickness of the flange element 2. The bourdon tube has a straight section 18 which forms an angle of approximately 45° with the upper face of the mounting 4. This section of tube merges into a circular, arcuate tube-section 19 which embraces the pointer mechanism 7.

The pressure gauge is assembled in the following manner. As a result of the particular construction and arrangement of the bourdon tube 6, it is possible to pass the tube through the fixing hole 3 with the fixing end foremost. The bourdon tube mounting 4 is welded to the wall of the hole 3. This can be done for example by ultrasonic welding techniques. The pointer mechanism 7 and the bezel 8 are then fitted and the fixing studs 9 and 11 riveted over to secure the pointer mechanism and bezel in position. The end of the bourdon tube is connected to the pointer mechanism 7 and the pointer 20 is assembled. Subsequently, zero adjustment is carried out, whereupon using the ring 16, the sight glass 17 is fitted to the front of the plate 1. The housing cover 14 is attached to the gauge through the agency of the fixing rim 13 and may be secured in position as by welding or as by adhesion. The housing cover may be fitted either prior to making the zero adjustment or subsequent thereto.

Figure 5:
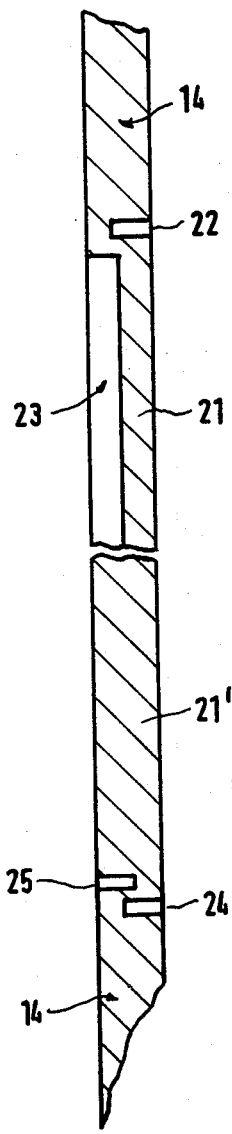
FIG. 5 is a larger sectional view of the housing cover with blow-out hole cover.
Figure 6:
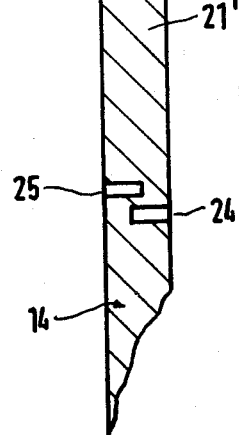
FIG. 6 is a similar sectional view of another embodiment.

The embodiments of the housing 14 with the cover 21, have been shown in FIGS. 5 and 6.

The first of these embodiments is shown in FIG. 5, from which it can be seen that at the internal rear side of the housing 14 there is provided a preferably circular slot 22. At the other side of the housing 14 and inside the zone circumscribed by the slot 22, the housing has a portion of reduced thickness as shown at 23 to form a weak cover portion 21. As shown in FIG. 6, the arrangement can also be so contrived that at each side of the housing cover 14 a slot 24, 25 is formed, these slots, viewed in section, preferably overlapping one another at least slightly. In this case, the wall thickness is not reduced in the neighbourhood of the cover 21'.

As will be readily understood, the slots weaken the portion of the cover 14 in which they are disposed, thereby enabling the weak cover-portion 21 to be blown out in the event of a pressure build up.

The slots 22, 24, 25 and the recess 23 will preferably be formed by injection-moulding techniques during the manufacture of the cover 14. It is also possible, however, to produce the slots 22, 24, 25 in the housing 14, after the manufacture of the latter.

The described and illustrated embodiments are not restrictive and the invention can be modified in many ways within the scope of the invention concept.

What I claim as my invention and desire to secure by Letters Patent of the United States is:

1. A pressure gauge comprising:
   a. a plate;
   b. a bourdon-like tube;
   c. mounting means for mounting said tube on said plate;
   d. a flange portion on said plate which extends outwardly at substantially right angles from said plate, said flange portion having a recess and being provided with an opening for receiving said mounting means, and said bourdon-like tube has a portion which extends from said mounting means in the form of a hook; and
   e. a cover mounted on said plate so as to enclose said tube, said cover having a recess area for cooperation with said recess on said flange portion of said plate, and said cover is provided with a weakened area formed by two circular grooves, each of which is formed in a mutually opposite side of said cover.

2. A pressure gauge as claimed in claim 1, wherein the depth to which respective slots penetrate the cover is such that the slots overlap one another.

* * * * *